US006360824B1

(12) United States Patent
Singley

(10) Patent No.: US 6,360,824 B1
(45) Date of Patent: Mar. 26, 2002

(54) FARRIER'S SIGHTING INSTRUMENT

(76) Inventor: Robert Singley, 11529 Citrus Grove, Goodyear, AZ (US) 85233

( * ) Notice: Subject to any disclaimer, the term of this patent is extended or adjusted under 35 U.S.C. 154(b) by 0 days.

(21) Appl. No.: 09/523,058

(22) Filed: Mar. 10, 2000

(51) Int. Cl.[7] ................................................ A01L 11/00
(52) U.S. Cl. ........................................... 168/45; 33/195
(58) Field of Search .............................. 168/45; 33/195, 33/429, 430, 434

(56) References Cited

U.S. PATENT DOCUMENTS

| 583,706 A | 6/1897 | Kearns | |
|---|---|---|---|
| 602,952 A | 4/1898 | Millett | |
| 832,060 A | 10/1906 | Holmquist | |
| 1,202,348 A | * 10/1916 | Yates | ........................... 33/195 |
| 3,145,476 A | * 8/1964 | Hester, Jr. | ...................... 33/429 |
| 4,214,370 A | 7/1980 | Beaston | ........................ 33/195 |
| 4,227,311 A | 10/1980 | Behney | ......................... 33/195 |
| 4,429,749 A | 2/1984 | Nelms | ........................... 168/45 |
| 4,813,148 A | 3/1989 | Finnegan | ...................... 33/195 |
| 5,027,520 A | 7/1991 | Finnegan | ...................... 33/195 |

* cited by examiner

Primary Examiner—Robert P. Swiatek
(74) Attorney, Agent, or Firm—LaValle D. Ptak

(57) ABSTRACT

A farrier's sighting instrument is designed as a portable, lightweight tool, easily carried by a farrier. It comprises a flat, transparent plate of a rectangular configuration, and sized to overlie the foot of a horse. The plate has a plurality of parallel indicia line sets on it, with the line sets arranged perpendicular to one edge of the plate. The lines in the line sets are spaced from one another by a uniform distance. A stop plate is attached to the one edge, and extends above the top surface of the flat transparent plate, with the stop plate located in a plane perpendicular to the plane of the parallel indicia lines.

15 Claims, 5 Drawing Sheets

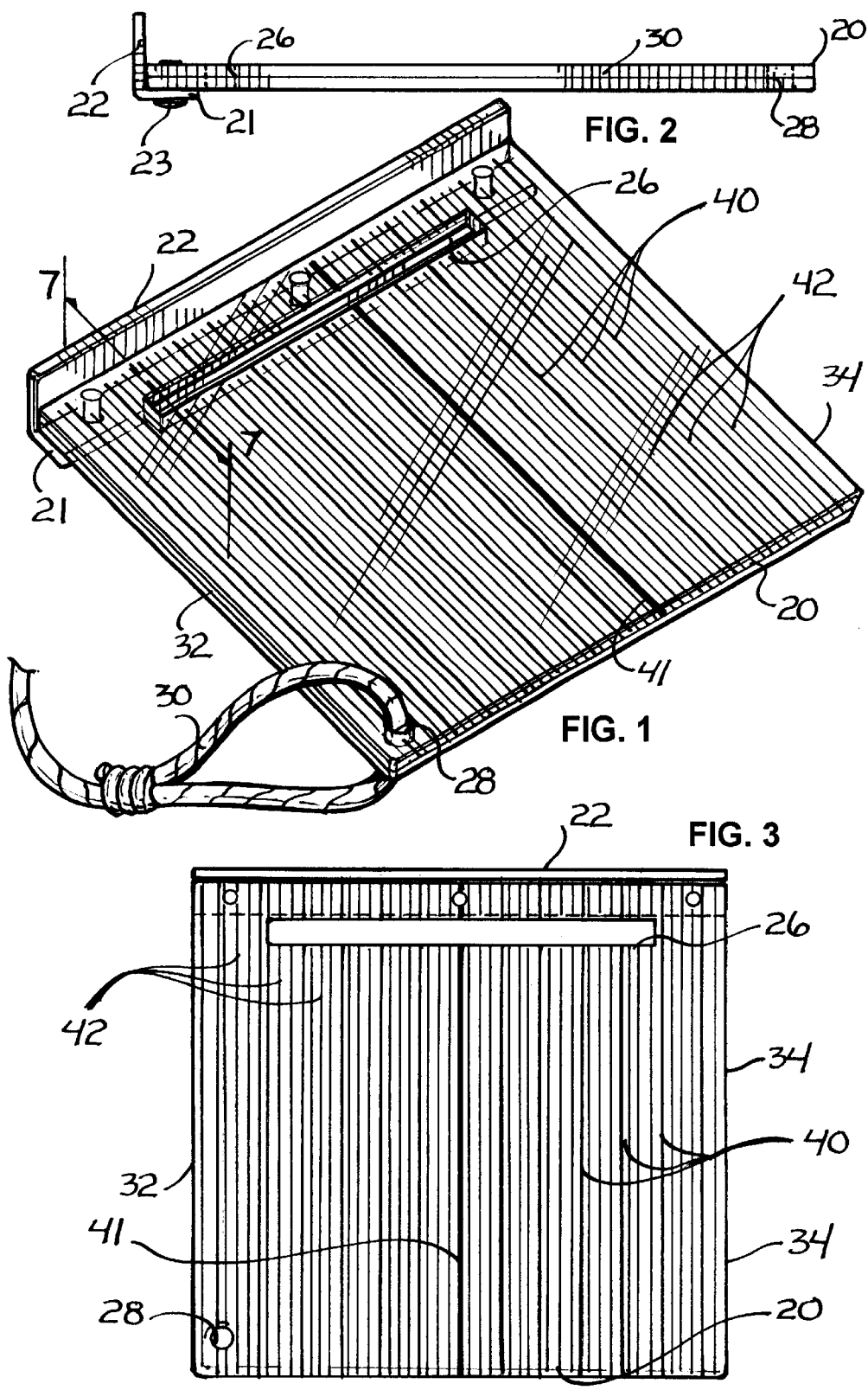

FARRIER'S SIGHTING INSTRUMENT

BACKGROUND

The field of horseshoeing generally is considered an art or a skill, rather than a science, since traditionally all of the steps inherent in the process of applying a set of horseshoes to the feet of the horse is based upon a visual examination by the farrier. For example, the farrier looks at the bottom of the foot in order to determine its flatness and the plane of the bottom of the foot relative to the leg of the horse. After this observation is made, the farrier makes any necessary corrections by peeling, cutting, filing or otherwise removing part of the bottom of the hoof. The horseshoe then is nailed in place to the corrected bottom of the hoof. Because of the nature of this process, however, errors are frequent; and such errors can lead to improper wear of the horseshoe, and, more seriously, may lead to actual damage of the leg and foot of the horse.

To avoid such errors, it is particularly important for the farrier to measure the extent of side-to-side balance of the foot. A balanced foot assures that the foot strikes the ground flat and evenly. This assures that there will be optimum support from the foot, up through the rest of the bony column of the leg. A foot that is in proper medial/lateral balance will help maintain proper alignment of the leg joints, thereby exposing them to less stress rotation and deviation. This also will provide these joints with optimum flexion. Improper medial/lateral balance causes the foot to strike the ground unevenly, and induces undesired stress, rotation and deviation in the joint of the leg of the horse.

Precise medial/lateral balance is very difficult to determine by the naked eye. Thus, a great deal of skill is required on the part of the farrier to visually obtain the desired results. Without such skill, disastrous results sometimes occur.

The United States patents to Finnegan U.S. Pat. Nos. 4,813,148 and 5,027,520 are directed to devices to help in determining the flatness of the foot of a horse in assisting the farrier in making necessary corrections. These devices are cumbersome and involve multiple parts, which must be adjusted while the device is attached to or placed on the foot of the horse. Because of the somewhat complex nature of these devices, they are not readily carried on the person of the farrier; and because of the multiple adjustments which must be made, they are difficult to use. Some horses will not remain quiet long enough to permit a farrier to make the necessary adjustments using tools of the types disclosed in these patents.

The United States patent to Beaston U.S. Pat. No. 4,214,370 is directed to a hoof alignment tool for measuring the size and determining the shape of a horse's hoof. This tool includes a pair of pivotal arms and a straight edge member to permit the tool to be closed around the outer hoof wall to measure both the hoof length and the angle of the wall with respect to the base of the hoof. The device of this patent, however, requires it to be manipulated and clamped onto the foot of the horse in order to effect the necessary measurements. Because of the adjustments which must be made in using this tool, it again is cumbersome and difficult to use. As with the tools of the Finnegan patents mentioned above, it also is sufficiently bulky that it is not readily carried on the person of the farrier for convenient use and application.

Four other United States patents are directed to various devices for measuring and leveling horses' feet, or for altering the leg conformation by changing the angle on the bottom of the foot. These patents are: Kearns U.S. Pat. No. 583,706; Millett U.S. Pat. No. 602,952; Holmquist U.S. Pat. No. 832,060 and Behney U.S. Pat. No. 4,227,311. All of the devices disclosed in these patents comprise multiple parts which require set screw or other types of adjustments by the farrier. They clamp onto the horse's foot, which presents a safety problem in the event that the horse should suddenly kick or move its foot while the device is either being applied to or removed from the foot of the horse. In addition, all of them are relatively cumbersome and bulky; so that they are not readily carried on the person of the farrier for quick and simple application.

It is desirable to provide an instrument for assisting a farrier in determining medial/lateral balance, symmetry or asymmetry, and to enable the farrier to precisely correct imbalance or other flaws with an instrument which is simple, accurate and easy to manufacture and use, as well as being durable and inexpensive.

SUMMARY OF THE INVENTION

It is an object of this invention to provide an improved farrier's instrument.

It is another object of this invention to provide an improved farrier's sighting instrument for simply and quickly measuring the medial/lateral symmetry or asymmetry of the foot of a horse.

It is still another object of the invention to provide an improved farrier's instrument for enabling a farrier to quickly determine that a horseshoe is correctly attached to the hoof of a horse.

It is a further object of this invention to provide an improved lightweight, portable farrier's sighting instrument which assists a farrier in measuring, trimming, filing and clipping the hoof of a horse in a correct manner, which additionally allows the farrier to measure the shoe for balance, length, flatness and symmetry/asymmetry prior to attaching the shoe to the hoof of the horse, and finally, to assist the farrier in attaching the shoe to the hoof.

In accordance with a preferred embodiment of the invention, a farrier's sighting instrument is comprised of a flat, transparent plate which has at least one straight edge, and which is dimensioned to overlie the foot of a horse. The flat, transparent plate has a plurality of parallel indicia lines in the plate; and these lines are perpendicular to the one straight edge. The lines also are spaced from one another by a uniform distance. A stop plate is attached to the one straight edge and extends above the surface of the flat, transparent plate in a plane which is perpendicular to the plane in which the parallel indicia lines are located. These simple elements of the tool permit a farrier to rapidly determine the symmetry/asymmetry of a horse's foot, and to measure the shape of a horseshoe prior to applying it to the foot, as well as assisting in proper attachment of the horseshoe to the foot of the horse.

BRIEF DESCRIPTION OF THE DRAWINGS

FIG. 1 is a top perspective view of a preferred embodiment of the invention;

FIG. 2 is a side view of the embodiment shown in FIG. 1;

FIG. 3 is a top view of the embodiment shown in FIG. 1;

DETAILED DESCRIPTION

Figure 4:
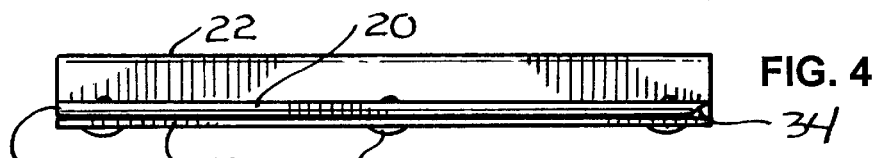
FIG. 4 is an end view of one of the elements of the embodiment shown in FIG. 1.
Figure 5:
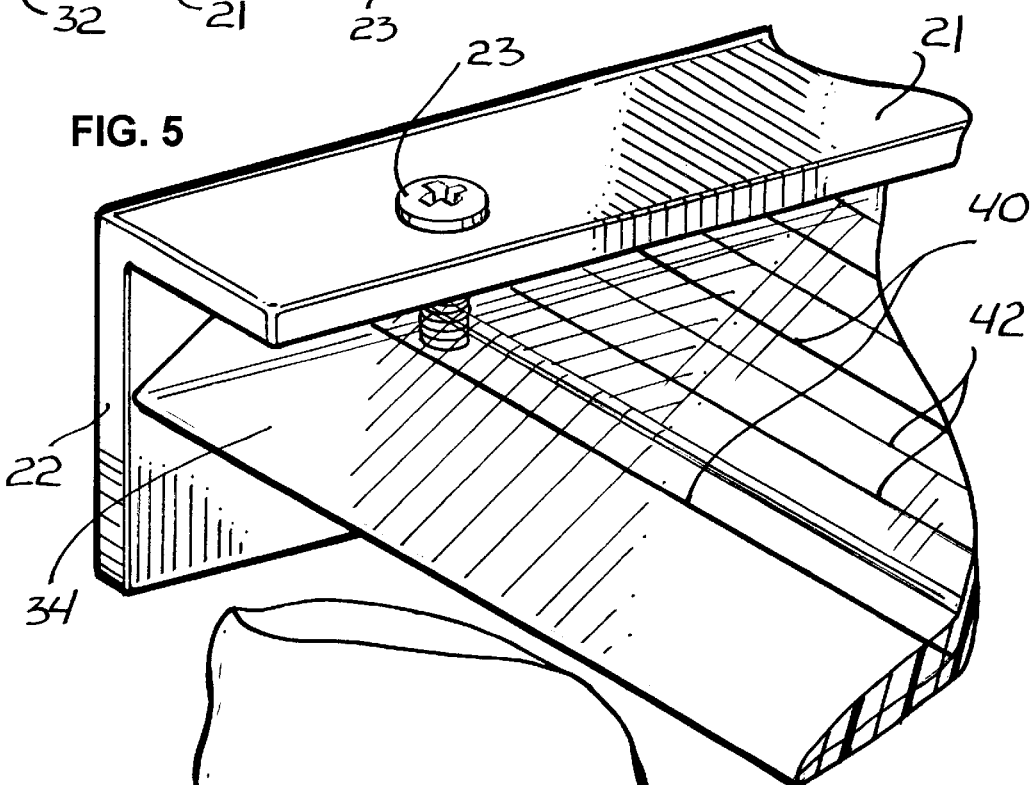
FIG. 5 is an enlarged detail of a portion of the embodiment shown in FIG. 1.

Reference now should be made to the drawings, in which the same reference numbers are used throughout the different figures to designate the same or similar components. The farrier's sighting instrument is illustrated in FIGS. 1 to 5, and 7, and it comprises a flat, rectangular, transparent plate 20 approximately six inches wide by 6½ inches long, with a thickness of ¼ inch, made of plexiglass or hard plastic. The bottom edge of the plate 20 has an angled bracket 21/22 attached to it by means of suitable fasteners 23. The portion 22 of the bracket 21/22 extends upwardly above the top surface of the plate 20 by a distance of approximately one-half inch to form a stop plate adjacent the top surface of the plate 20.

The center of the plate 20 has a straight visible line 41 extending from the bracket 22 to the front edge of the plate 20 and parallel to the opposite sides 32 and 34. Typically, this line 41 is approximately ⅛" wide, and is made of a readily observable color, such as black. The line 41 may be painted on the surface of the plate 20, or it may be in the form of an embedded thread or rod; so that it is clearly visible through both sides of the plate 20.

As shown throughout the different figures, there is an additional plurality of primary lines 40 spaced at uniform intervals on both sides of the center line 41, and running parallel to it. Between each of the lines 40 are additional secondary lines 42; so that the lines 40/42 comprise uniformly spaced sets or groups of lines extending parallel to the center line 41 on both sides of the center line 41. Ideally, the lines 40 are of the same color as the center line 41; and additional colors, such as white, red and grey, are used for the three lines 42 which are found between each of the primary black lines 40. While specific colors and specific weights of lines are indicated, it is apparent that different colors and desired spacings of the lines from one another may be employed. It has been determined that an ideal spacing of the lines 40/42 from one another is a uniform spacing of approximately ⅛"; so that a visual observation rapidly can be made of symmetry or asymmetry about the center line 41 when the device is applied to the hoof of a horse, or to a horseshoe, in the manner described subsequently.

Another feature of the tool is the formation of a line by way of an elongated slot 26 formed adjacent the stop 22, and extending a primary portion of the distance across the plate 20 parallel to the stop plate 22 and perpendicular to the lines 40/41/42. As shown most clearly in FIGS. 1 and 5, the right-hand edge 34 of the plate 20 (as observed in FIGS. 1 and 3) is tapered to a point. This edge also can have lines similar to the lines 40/42 on it, with these additional lines (not shown in FIG. 5) running parallel to the lines 40/42.

To complete the instrument, a hole 28 is formed in one of the corners opposite the stop plate 22, and a rope 30 or other suitable carrier may be inserted through the hole 28 to allow the farrier's sighting instrument of FIG. 1 to be worn on the belt or otherwise conveniently carried by the farrier. As is readily apparent from the foregoing description, the tool which is shown in detail in FIGS. 1 through 7 is a simple tool which includes no moving parts, which is lightweight, relatively small and easy to use.

Figure 6:
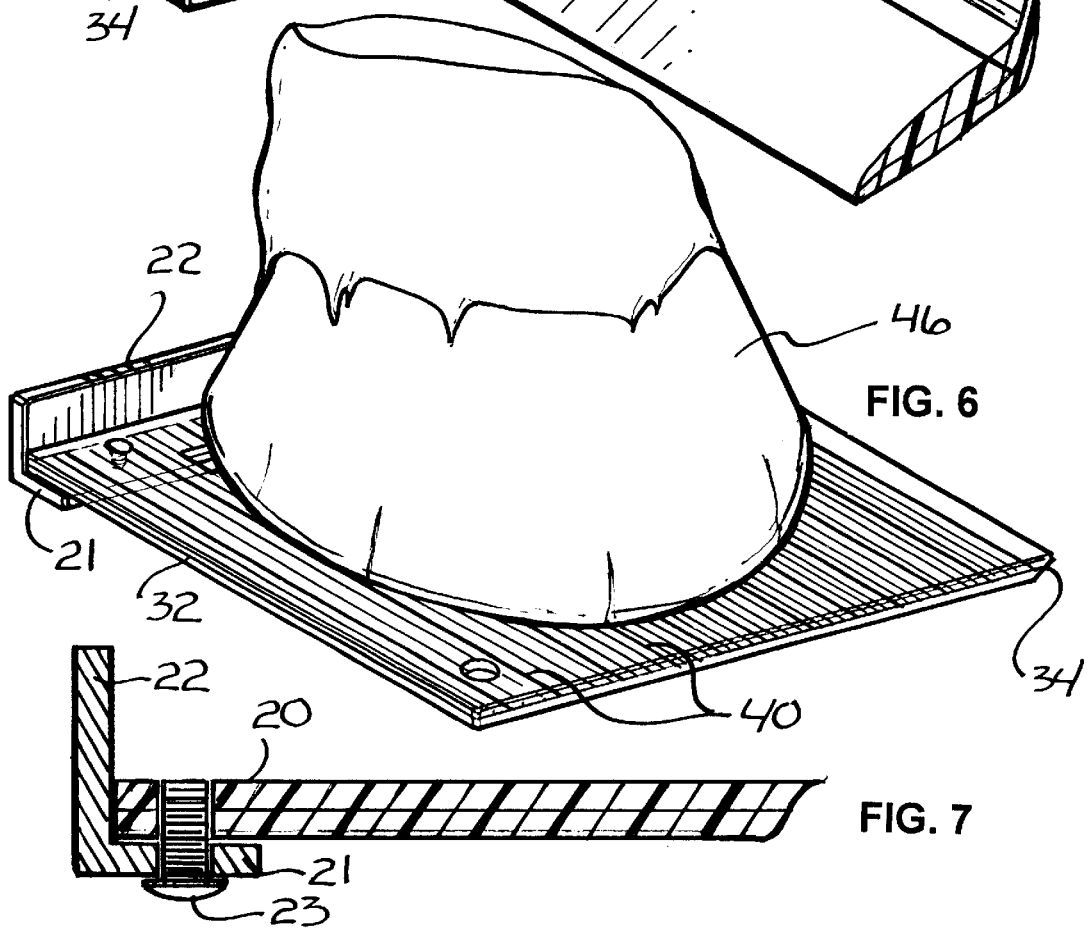
FIG. 6 illustrates one manner of use of the instrument shown in FIG. 1.
Figure 7:
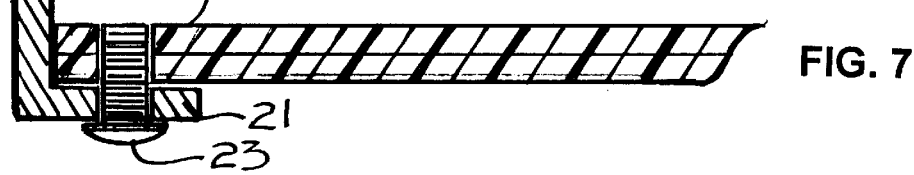
FIG. 7 is a partial cutaway view of the embodiment shown in FIG. 1 taken along the line 7—7 of FIG. 1.

FIG. 6 shows the use of the sighting instrument of Figure placed beneath the hoof 46 of a horse, with the stop plate 22 pressed against the heel of the hoof 46. The center line 41 is centered between the center of the heel and the front of the hoof; so that the farrier can visually determine, looking down on the tool as shown in FIG. 6, the symmetry or asymmetry of the hoof. This measurement can be taken prior to the horseshoeing operation as a first step, and subsequent to completion of the operation to ensure that proper symmetry has been achieved.

Figure 8:
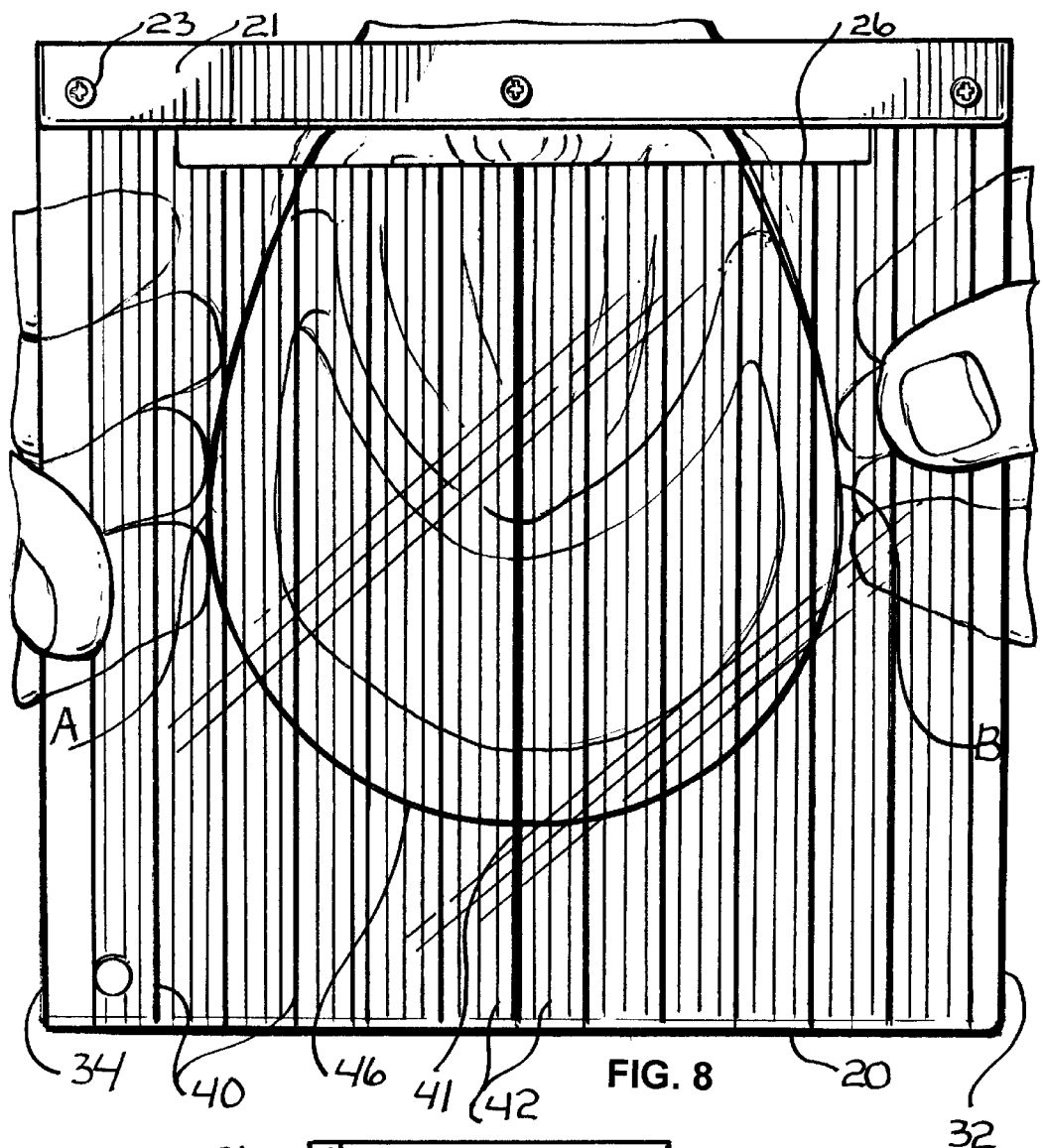
FIG. 8 illustrates the use of the tool of FIG. 1 in checking a hoof for symmetry.

FIG. 8 shows use of the instrument to check for symmetry and branch length of a hoof in a manner similar to that of FIG. 6, but using the instrument with the hoof turned upward, and checking the alignment from the bottom side of the hoof. Again, the line 42 is placed at the center of the heel of the hoof; and the backing plate 22 is pressed against the heel. The symmetry of the foot then is readily determined by observation of the locations "A" and "B" relative to the lines 40/42 of the sets on each side of the center line 41. It is readily apparent from an examination of FIG. 8 that a rapid evaluation of the symmetry of lack of symmetry of the hoof 46 may be made visually by determining where the points A and B lie with respect to the different sets of lines 40/42 of the instrument. This position of the instrument, as shown in FIG. 8, also may be used to determine the branch length of the hoof for selecting a proper horseshoe size. Branch length checking is facilitated by utilizing the instrument as illustrated in FIG. 9, turning it 90° from the position shown in FIG. 8, and then counting the major lines 40 and the lesser lines 42 from the heel of the hoof to the front, to make the proper determination.

Figure 9:
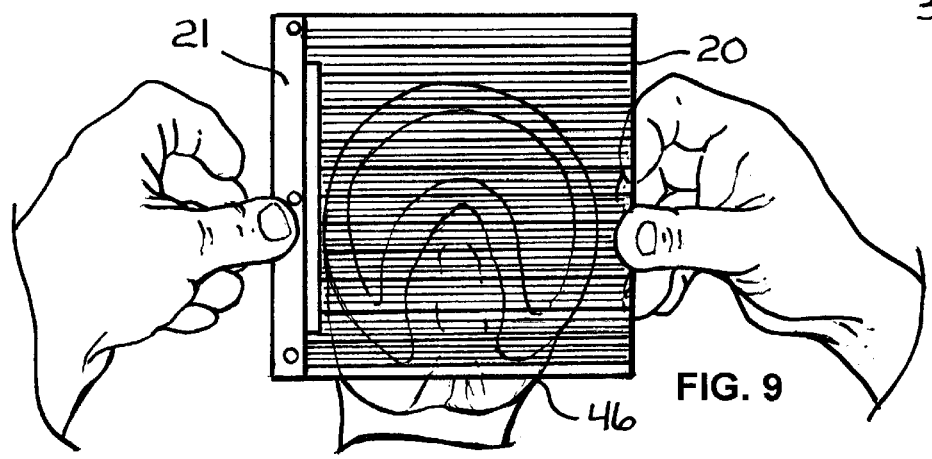
FIG. 9 illustrates the use of the tool shown in FIG. 1 for checking for trim and breakover points.
Figure 10:
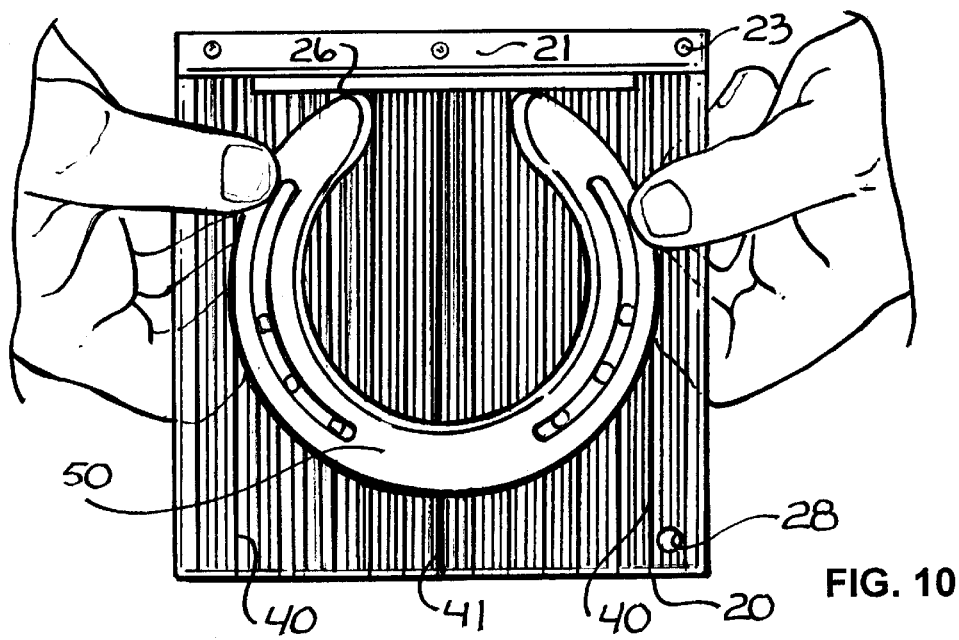
FIG. 10 shows the use of the tool of FIG. 1 in checking shoe symmetry.

FIG. 10 illustrates the manner of using the instrument in a similar way to the use depicted in FIGS. 8 and 9, but for checking the symmetry and size of a horseshoe to be applied to the hoof of the horse following measurements made in accordance with FIGS. 8 and 9. It is to be noted that the open ends of the horseshoe 50 in FIG. 10 are placed on the edge of the slot 26 for this measurement. The width of the slot 26 is selected to typically equal the distance difference between the point at which the stop plate 22 presses against the heel of the hoof 46, as shown in FIG. 8, and the place where the ends of the shoe 50 reside on the hoof after the shoe has been applied to the hoof. Again, by using the instrument as shown in FIG. 10, the symmetry or asymmetry of the shoe 50 readily may be ascertained.

Figure 11:
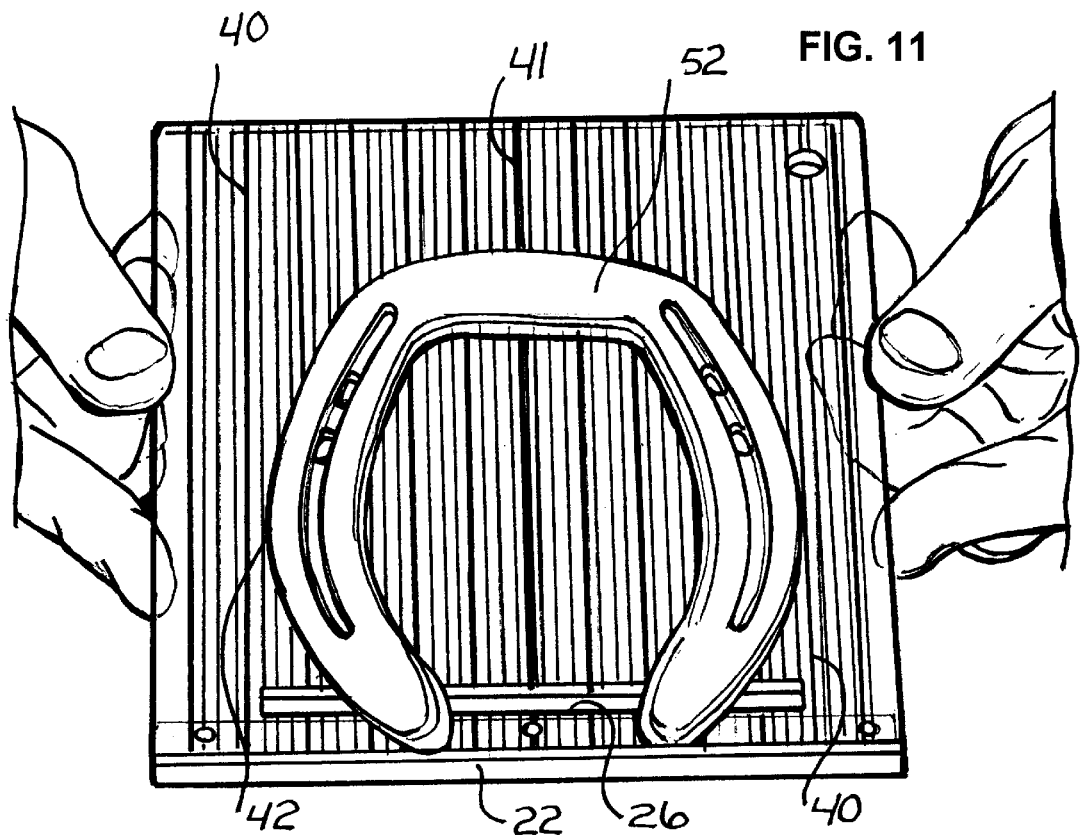
FIG. 11 shows the use of the tool of FIG. 1 for checking asymmetry of a rear square-toed shoe.

As illustrated in FIG. 11, shoes to be placed on the rear feet of a horse need to be somewhat asymmetrical; whereas shoes for the front feet, as illustrated in FIG. 10, need to be symmetrical. The instrument readily may be utilized in conjunction with a rear shoe 52 to show the asymmetry of the shoe quickly and easily; so that proper adjustment may be made prior to applying the shoe to the foot of the horse.

Figure 12:
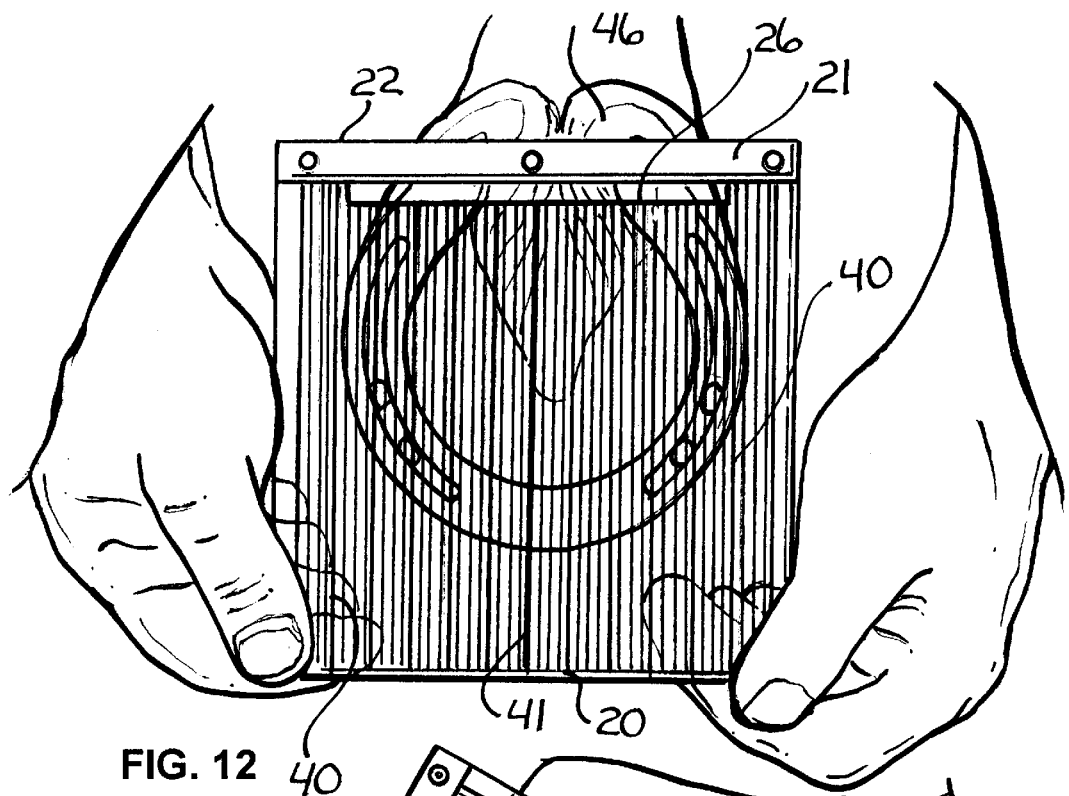
FIG. 12 illustrates use of the tool of FIG. 1 in ensuring the shoe is on straight prior to full nailing of the shoe onto the hoof.

FIG. 12 illustrates the use of the instrument to assist the farrier in initial application of a shoe 50 or 52 to the foot of a horse after a first nail is driven into the shoe. Adjustment of the shoe then is made in accordance with the sighting of the various lines 40/41/42 to ensure that the shoe is properly aligned with the hoof. The remainder of the nails then are driven; and the instrument once again may be used as shown in FIG. 12 to verify that the shoe is correctly applied to the hoof.

Figure 13:
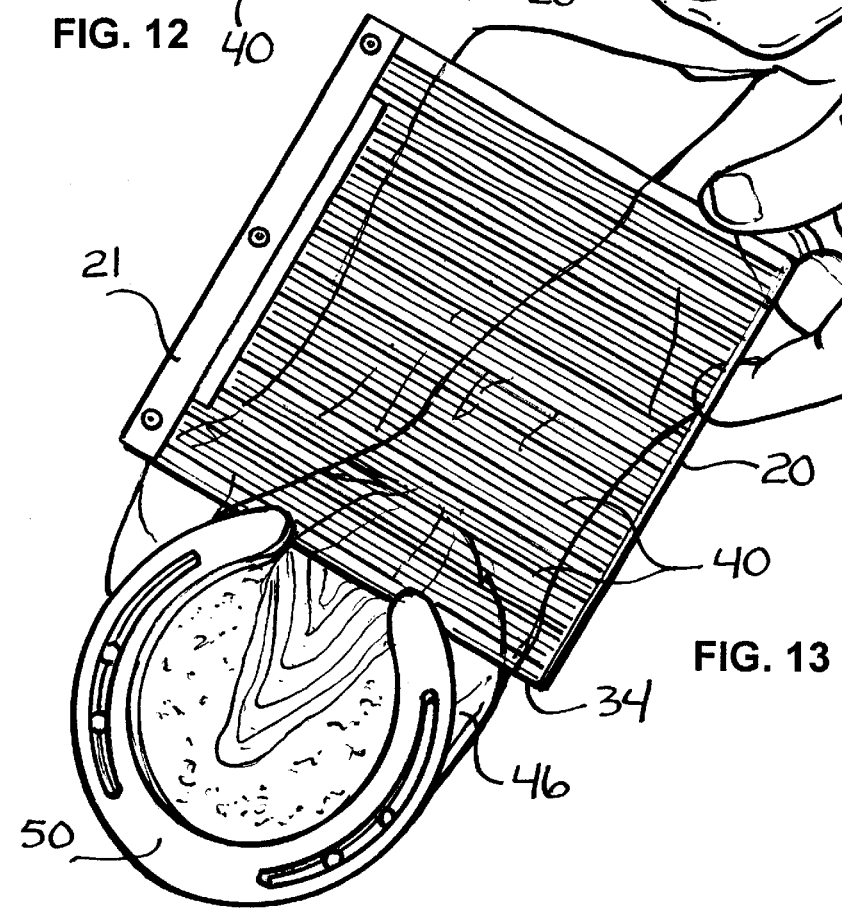
FIG. 13 shows the use of the tool of FIG. 1 in checking the distance from the end of the shoe to the end of the hoof.

FIG. 13 shows the manner in which the beveled edge 34 of the instrument may be inserted between the heel of the hoof and the ends of the horseshoe 50 to check the distance between the end of the shoe and the end of the hoof on both sides of the shoe 50. Again, the lines 40/42 on the instrument quickly provide an accurate indication of the correctness of this application of the horseshoe 50. A similar checking of the shoe position for a hind foot shoe, such as the shoe 52 of FIG. 11, can be made, the measurement being the same in the case of either a front hoof or a hind hoof.

It is readily apparent from the foregoing that the farrier's sighting instrument, which is shown and described in conjunction with a preferred embodiment of the invention, permits rapid visual verification of various measurements in conjunction with the shoeing of a horse. The instrument permits rapid checks of symmetry, asymmetry, branch length and breakover points (for square shoes) in a manner which is rapid and effective. No attachment of a multi-part, complex tool, such as are found in the prior art, is required. The instrument is lightweight and easy to use, and permits accurate shoeing of a horse by a farrier. In addition, the instrument permits checking of the shoeing of a horse by its owner.

The foregoing description of the preferred embodiment of the invention is to be considered as illustrative and not as limiting. Various changes and modifications will occur to those skilled in the art for performing substantially the same function, in substantially the same way, to achieve substantially the same result without departing from the true scope of the invention as defined in the appended claims.

What is claimed is:

1. A farrier's sighting instrument including in combination:
   a flat transparent plate having a top surface and at least one straight edge, and dimensioned to overlie the foot of a horse;
   a plurality of parallel indicia lines on the plate perpendicular to the one straight edge, the parallel indicia lines spaced from one another by a uniform distance with a primary one of the plurality of parallel indicia lines located substantially at the mid-point of the at least one straight edge and visually distinguishable from the remainder of the plurality of parallel indicia lines; and
   a stop plate attached to the at least one straight edge of the transparent plate and extending above the top surface thereof, the stop plate being in a plane perpendicular to the parallel indicia lines.

2. The farrier's sighting instrument according to claim 1 wherein the flat transparent plate is a rectangular plate.

3. The combination according to claim 2 wherein the plurality of parallel indicia lines comprise a plurality of sets of indicia lines with the indicia lines in each set being distinguishable from one another.

4. The combination according to claim 3 wherein the plurality of indicia lines of each set comprise lines of different colors.

5. The combination according to claim 4 further including a reference line extending perpendicular to said plurality of parallel indicia lines and located on said flat transparent plate adjacent the stop plate.

6. The combination according to claim 5 wherein the reference line comprises an open slot formed through the flat transparent plate adjacent the stop plate.

7. The combination according to claim 6 wherein the flat transparent plate has a predetermined thickness and first and second opposite edges thereof extending perpendicular to said at least one straight edge with the first edge beveled at an angle between top and bottom surfaces of the flat transparent plate.

8. The combination according to claim 7 wherein the plurality of parallel indicia lines are spaced approximately ⅛Δ apart from one another.

9. The combination according to claim 8 wherein the flat transparent plate is made of plastic material.

10. The combination according to claim 1 wherein the plurality of parallel indicia lines comprise a plurality of sets of indicia lines with the indicia lines in each set being distinguishable from one another.

11. The combination according to claim 10 wherein the plurality of indicia lines of each set comprise lines of different colors.

12. The combination according to claim 11 wherein the plurality of parallel indicia lines are spaced approximately ⅛Δ apart from one another.

13. The combination according to claim 1 further including a reference line extending perpendicular to the plurality of parallel indicia lines and located on the flat transparent plate adjacent the stop plate.

14. The combination according to claim 13 wherein the reference line comprises an open slot formed through the flat transparent plate adjacent the stop plate.

15. The combination according to claim 1 wherein the flat transparent plate has a predetermined thickness and first and second opposite edges thereof extending perpendicular to the at least one straight edge with the first edge beveled at an angle between top and bottom surfaces of the flat transparent plate.

* * * * *